(12) United States Patent
De Sars

(10) Patent No.: US 8,075,681 B2
(45) Date of Patent: Dec. 13, 2011

(54) PROCESS FOR PRODUCING TWO-PHASE MIXES

(75) Inventor: Thierry De Sars, Lyons (FR)

(73) Assignee: Eurovia, Rueil Malmaison (FR)

( * ) Notice: Subject to any disclaimer, the term of this patent is extended or adjusted under 35 U.S.C. 154(b) by 265 days.

(21) Appl. No.: 12/340,127

(22) Filed: Dec. 19, 2008

(65) Prior Publication Data

US 2009/0163624 A1   Jun. 25, 2009

(30) Foreign Application Priority Data

Dec. 21, 2007 (FR) .................... 07 60279

(51) Int. Cl.
*C08L 95/00* (2006.01)
(52) U.S. Cl. ............... 106/281.1; 106/277; 524/59
(58) Field of Classification Search ........... 106/273.1, 106/277, 281.1, 668; 524/59
See application file for complete search history.

(56) References Cited

U.S. PATENT DOCUMENTS

| | | | | |
|---|---|---|---|---|
| 1,836,754 A | * | 12/1931 | Hepburn | 106/281.1 |
| 2,051,577 A | * | 8/1936 | Schloss | 106/280 |
| 2,073,907 A | * | 3/1937 | Scullin | 106/280 |
| 2,104,410 A | | 1/1938 | Baskin | |
| 2,349,446 A | * | 5/1944 | McGrane | 106/280 |
| 3,868,262 A | * | 2/1975 | Ohlson | 106/284.01 |
| 4,978,393 A | | 12/1990 | Maheas | |
| 4,992,492 A | | 2/1991 | Sainton | |
| 5,582,639 A | * | 12/1996 | Hove | 106/281.1 |
| 7,114,843 B2 | | 10/2006 | Romier et al. | |
| 7,114,875 B2 | | 10/2006 | Romier et al. | |
| 2004/0223808 A1 | | 11/2004 | Romier et al. | |
| 2006/0127572 A1 | | 6/2006 | Raynaud | |
| 2006/0236614 A1 | * | 10/2006 | Antoine et al. | 51/293 |
| 2006/0240185 A1 | | 10/2006 | Antoine et al. | |

FOREIGN PATENT DOCUMENTS

| | | |
|---|---|---|
| EP | 0 352 648 B1 | 2/1993 |
| EP | 1 469 038 A1 | 10/2004 |
| EP | 1 469 127 B1 | 10/2004 |
| FR | 2 449 162 | 9/1980 |
| FR | 2 623 219 | 5/1989 |
| FR | 2 678 653 | 1/1993 |
| FR | 2 884 264 | 10/2006 |

OTHER PUBLICATIONS

French Search Report issued May 8, 2008 in French application No. 0760279.

* cited by examiner

*Primary Examiner* — Helene Klemanski
(74) *Attorney, Agent, or Firm* — Foley & Lardner LLP

(57) ABSTRACT

This invention relates to a process for producing a hot, cold or lukewarm ready-to-use bituminous mix, characterized in that it includes the following successive steps:
(a) preparing a hot, cold or lukewarm master mix or bituminous mix by mixing some or all of the bituminous binder proportioned in liquid form with some or all of the aggregates, and optionally with
  some or all of the fines and/or
  some or all of the aggregate mix and/or
  some or all of the various additives
so as to obtain a mixture in which the aggregates and any fines and aggregate mix are coated by the bitumen,
(b) storing of the master mix or of the bituminous mix obtained in step (a),
(c) mixing the master mix or the bituminous mix stored in step (b) with one or more additional formulation components so as to obtain a hot, cold or lukewarm ready-to-use bituminous mix,
in which step (c) is implemented at the mix production site if the additional formulation component is a thinning agent.

15 Claims, No Drawings

PROCESS FOR PRODUCING TWO-PHASE MIXES

This invention relates to a process for producing hot, cold or lukewarm bituminous mixes ready for use, including an intermediate storage step.

A bituminous mix is a mixture of at least aggregate and a bituminous binder. Typically, and in a non-restrictive manner, the sufficient amount of binder in order to obtain 1 to 15 parts by weight of residual bitumen is mixed with 85 to 99 parts by weight of aggregates (considering their dry weight). Additives can be added to the binder, to the aggregates, or to the mix. The production of the mix, i.e. the way in which the constituents are mixed, can be obtained in various ways. Generally, two families of processes are distinguished: so-called "hot" processes and so-called "cold" processes. More recently, so-called "lukewarm" or "semi-lukewarm" processes have appeared, which fall between the cold and warm processes.

In the case of the so-called "hot" process, the aggregates are heated in devices called "dryers" so as to dry them, thus allowing for good adhesion of the bitumen to the aggregates. The bitumen is also heated, at temperatures on the order of 160° C. so as to reduce their viscosity and enable good mixing of the aggregates. The mix thus formed is then applied hot (typically at more than 150° C.) on the pavement, then compacted also under heat, with the initially high temperature ensuring its workability. The material then hardens as it cools.

In the so-called "cold" processes, the aggregates are not dried, and are mixed as such, i.e. with their natural moisture and at room temperature. The bitumen then arrives in various forms, with the most common being that of a bitumen emulsion, which thus makes it possible to have a product that is relatively non-viscous and therefore workable at room temperature. The emulsion is sometimes slightly heated to temperatures of the order of 50° C. Another means, of which the use is not yet widespread but is increasing, consists of foaming the hot bitumen (typically 160° C.) in contact with a small amount of water injected directly into the bitumen according to suitable processes, in order to then mix this foam with aggregates in their natural moisture. Additives can be added to the bitumen and/or to the water injected in order to modify the properties of the foam, in particular its stability and its volume.

The so-called "lukewarm" or "semi-lukewarm" processes, still used only marginally, and of which the name is sometimes different from that provided here (semi-hot, etc.) but which a person skilled in the art will certainly recognize, consist either of slightly heating the aggregate, but not enough to completely dry it, or of drying it at temperatures just above 100° C. A number of processes exist; the binder can be, for example, provided in the same forms as for the cold mixes (bitumen foam or emulsion). Also, and in particular when the objective is to reduce the temperature of production and implementation of the hot mixes, in order to limit smoke generation, it can require the use of original additives or processes in order for the mix to maintain a level of workability compatible with its implementation at temperatures below those normally used.

Bituminous mixes can also be produced continuously or discontinuously by processes well known to a person skilled in the art. Additives can be added to the mixture.

However, for certain types of additives, such as coloring agents, problems arise. Indeed, in general, the production volumes of colored mixes are low, thus not justifying reserving a dedicated plant network for them. Consequently, they are rarely produced continuously. Moreover, it is necessary to clean the plants well before producing colored mixes so that they will not be polluted by the black mixes present in the plant, and after production of these mixes to prevent the pollution of other non-colored mixes that will be produced there afterward. This therefore presents a problem of efficiency and disruption of the normal operation of the mixing plant.

To avoid these problems, it is known in the case of translucent binders, to produce an intermediate product that is stored before producing the mix (FR 2 678 653). However, in this case, the intermediate product stored is a finished product in its formulation, but is not a ready-to-use mix because it is in particulate form, and the aggregates are not bound to the binder. It is therefore necessary to heat it before use in order to produce a real mix.

It would also be beneficial to be capable of storing an intermediate product before adding the final additives so as to be capable of obtaining a certain flexibility.

Moreover, it would also be beneficial to modify ready-to-use hot mixes obtained from a conventional process. Indeed, if these hot mixes are not used within 48 hours of their production, it will no longer be possible to use them. It is then necessary to dispose of them or to recycle them in the form of aggregate mixes, i.e. to crush them before any reuse in other mixes. This therefore adds a crushing step to the mix production process, which step lengthens these processes and therefore increases their cost. It is also necessary to increase the temperature of these aggregate mixes, leading to additional production and energy costs.

It is also known, according to patent application FR 2 623 219, the production of storable cold dense bituminous mixes in which the small size aggregates (particle size of 0/2 or 0/4 mm) are stored after coating, before being added at the end of the medium or large size aggregates (2/D mm and 4/D mm) mixing phase.

However, the small size aggregates (only elements stored) cannot be considered to be a mix or a master mix according to this invention.

Indeed, as indicated in the U.S. Pat. No. 4,978,393, which belongs to the same family as patent FR 2 623 619, the product obtained does not agglomerate during storage and acts as a non-coated material. However, in the case of the present invention, the master mix or the mix is agglomerated, since the problem to be solved is that of providing a homogeneous mixture of the additional formulation component with the master mix and/or the mix obtained at the end of step (a) of the process according to the invention.

It is also known from document EP 1 469 127 to add water just before spreading the bituminous mix, i.e. when the bituminous mix is implemented.

However, in the case of the present invention, when the additional formulation component is a thinning agent, it is added at the production site and not during spreading of the bituminous mix. This has the advantage of using a conventional spreading material, while in EP 1 469 127, the spreading material is very specific in order to enable the mixture of the thinning agent with the mix.

In addition, the addition of the thinning agent at the production site enables the malleability of the mix to be modified in order to facilitate its implementation, but also its transport to the spreading material, which can otherwise be problematic.

The inventors surprisingly discovered that it was possible to reuse the mixes obtained by conventional methods after storage, by adding one or more additives at the last minute in a second mixing step, and in particular in the case of thinning agents at the production site, without it having a detrimental effect on the quality of the mix obtained, i.e. without the cohesion or the mechanical qualities of said mix being significantly reduced, as the additive added is homogeneously mixed with the mix.

It is surprising, in particular in the case of powder additives, that the fact that the additives are added after storing the mix does not adversely affect their dispersion in the mix and that, for example in the case of coloring agents, the mixes obtained are substantially identical (visually and mechanically) to the mixes obtained by a conventional process (i.e. without intermediate storage). Indeed, once the mix has been produced, i.e. once the bituminous binder has totally coated the aggregates and in particular migrated into the pores of the aggregates, it appears to be difficult for a person skilled in the art to add an additive, in particular a powder additive, without having problems of adhesion of the binder to the mix or uniform and homogeneous dispersion of the additive in the mix. However, these problems surprisingly do not arise in the process according to this invention.

This invention therefore relates to a process for producing a hot, cold or lukewarm ready-to-use bituminous mix, characterized in that it includes the following successive steps:

(a) preparing a hot, cold or lukewarm master mix or bituminous mix by mixing some or all of the bituminous binder proportioned in liquid form with some or all of the aggregates, advantageously some or all of the large, medium and/or small size aggregates, and optionally with
  some or all of the fines and/or
  some or all of the aggregate mix and/or
  some or all of the various additives
so as to obtain a mixture in which the aggregates and any fines and aggregate mix are coated by the bitumen, advantageously entirely coated by the bitumen, (b) storing of the master mix or of the bituminous mix obtained in step (a), (c) mixing the master mix or the bituminous mix stored in step (b) with one or more additional formulation components so as to obtain a hot, cold or lukewarm ready-to-use bituminous mix, in which step (c) is implemented at the mix production site if the additional formulation component is a thinning agent.

Step (c) enables a mix to be customized as needed. Thus, the mix obtained at the end of step (c) is suitable for its definitive and specific use, and step (c) is implemented at the mix production site if the additional formulation component is a thinning agent, advantageously if the additional formulation component is in liquid form. Indeed, in this case, step (c) is not implemented at the mix spreading site, for example during spreading.

The spreading site corresponds to the site where the mix is used. It is, for example, a road or a sidewalk.

In the sense of this invention, by "mix production site", it is intended to mean one or more sites, other than the spreading site, where steps (a), (b) and (c) are implemented.

The process according to the invention is therefore based on the principle of production of a (hot, lukewarm or cold) mix formulation in two distinct phases:
  a phase 1 (step (a)) based on the proportioning and mixing of an amount of formulation constituents including some or all of the binder proportioned in the liquid state.
  a phase 2 (step (c)) based on the proportioning and mixing complement in order to obtain the final product.

These two phases are separated by a storage (step (b)). There is therefore a transfer of the product between the device of step (a) and the storage device of step (b) and between the storage device of step (b) and the device of step (c).

Advantageously, the device of step (c) is located at the mix production site.

Thus, the process according to this invention makes it possible to complete a mix formulation on demand with additional formulation components, i.e. to produce, in a large amount, a mix in step (a), then to add, on demand, various additional formulation components in order to produce smaller amounts of mix thus suitable for its final use.

In particular, when colored mixes are produced, the process according to the invention enables, in step (a), a non-colored mix to be produced, and, in step (c), the desired coloring agent to be added. This process then has the following advantages:
  possibility of producing colored (red or other) mixes at a continuous plant with a service quality equivalent or superior to a discontinuous plant;
  no waiting period insofar as the mix suitable for step (c) can immediately be produced without stopping the production of other mixes in progress,
  production of small amount possible,
  no pollution of the mix (due to black mixes capable of breaking off in the processes of mixing, transfer or storage of mixes of conventional processes implemented).

In the sense of this description, by "master mix", it is intended to mean the common part of the formulation of a plurality of types of mixes not containing all of the bitumen and/or aggregates necessary for the production of a ready-to-use mix. This common part is agglomerated because it contains a portion of the bitumen that enables agglomeration with the various constituents of the master mix. It is therefore an agglomerated master mix. The master mix has a form similar to that of a mix and therefore consists of the base of the formulation for a mix, with the additional formulation component making it possible to obtain a more particular mix, for example with the desired color or with improved resonance or aesthetic properties or modified malleability properties.

In the sense of this invention, by "bituminous binder", it is intended to mean any hydrocarbon binder, advantageously of fossil origin, or any plant-based binder that can be used to produce a mix. Advantageously, it is a pure bitumen, an additive-containing bitumen, for example with additives such as fluxing agents and/or thinning agents and/or hydrocarbon-based waxes, whether synthetic, plant-based or fossil plant-based, and/or polymers and/or organic acid, alone or in combination, a clear synthetic oil-based binder, a pigmentable bitumen, a colored bitumen or a plant-based binder.

This bitumen binder can be in liquid form or in the form of an emulsion or a foam. Advantageously, when producing cold or lukewarm bituminous mixes, the bituminous binder is in the form of an emulsion or a foam.

In the sense of this invention, by "aggregates", it is intended to mean road aggregates of various origins, including aggregates from strip mines or gravel pits, slag, shale, artificial aggregates of any origin coming, for example, from solid waste incinerator bottom ash, as well as mixtures thereof in any proportion; advantageously, these aggregates can be dry or moist. Advantageously, they can have been pretreated before use in the process according to this invention, for example by pre-coating with an oil.

The particle size of the aggregates is chosen in the range of $0/D_{max}$, with $D_{max}$ being the maximum diameter of the aggregates as defined according to standard XP 18-545 of February 2004, and ranging from 0 to 45 mm.

Advantageously, the aggregates according to the invention include small, medium or large size aggregates and mixtures thereof.

In the sense of this invention, by "small size aggregates", it is intended to mean aggregates from 0 to 4 mm, and advantageously from 0 to 6 mm.

In the sense of this invention, by "large size aggregates", it is intended to mean aggregates from 14 to 45 mm, and advantageously from 10 to 45 mm.

In the sense of this invention, by "medium size aggregates", it is intended to mean aggregates from 4 to 14 mm, and advantageously from 6 to 10 mm.

Advantageously, the portion of aggregates added in step (a) of the process according to this invention consists of all of the small, medium or large size aggregates or the mixture of all of the small and large size aggregates or small and medium size aggregates or large and medium size aggregates, and the additional formulation component can consist respectively of all of the aggregates of the size not added in step (a).

In the sense of this invention, by "fines", it is intended to mean any mineral or siliceous filler, advantageously calcareous, with a size smaller than 80 μm, advantageously passing through a square-meshed sieve with sides of 0.063 mm. The fines can be added or recovered fines.

In the sense of this invention, by "aggregate mix", it is intended to mean any recovery material aggregate, advantageously resulting from the recycling of material recovered during reconstruction of roads or recycled bituminous mixes, therefore containing natural or artificial aggregates and binders in solid form.

In the sense of this invention, by "additives", it is intended to mean all of the elements that can modify the bituminous binder or the mechanical, visual or spreading properties of the mix or the master mix or even the aesthetic appearance of the mix or the master mix.

These additives can be proportioned in liquid, solid, pasty, powder or granular form. In an advantageous embodiment, the additive is chosen from fluxing agents, thinning agents, ground vulcanized rubber, fibers, glass or mirror pieces, zeolites, gilsonites, cements, lime, wire waste, polyethylene, polymers, coloring agents, waxes, plant-based additives and mixtures thereof.

In the sense of this invention, by "additional formulation components", it is intended to mean any component that makes it possible to modify a mix in order to customize it, and/or to make it ready-to-use or that enables a master mix to be converted into a ready-to-use mix.

These additional formulation components can be proportioned in liquid, solid, pasty or powder form or in granular form in step (c) of the process according to this invention. Advantageously, it is a solid, pasty or powder form or granular, even more advantageously in solid or powder or granular form, and most advantageously in powder form.

Advantageously, the additional formulation component(s) is (are) chosen from: the bituminous binder complement and/or the aggregate complement, advantageously chosen from all of the large, medium and/or small size aggregates and/or all of the fines or the complement thereof, and/or all of the aggregate mix or the complement thereof, and/or all of the additives or the complement thereof and the mixture thereof.

Advantageously, the additional formulation components are chosen from coloring agents, advantageously iron oxide, fluxing agents, thinning agents, advantageously water, ground vulcanized rubber, fibers, glass or mirror pieces, zeolites, gilsonites, cements, lime, wire waste, polyethylene, polymers, waxes, plant-based additives and mixtures thereof.

Particularly advantageously, the additional formulation components are powder additives, advantageously coloring agents, and advantageously iron oxide.

In a specific embodiment, the additional formulation components consist of the bitumen complement and an additive or a coloring agent in liquid, solid, powder or granular form and optionally a thinning agent.

In another advantageous embodiment of the invention, the additional formulation component includes a thinning agent alone or in combination with another additive.

Advantageously, all of the aggregates are added in step (a) of the process according to this invention.

Even more advantageously, all of the small and/or large size aggregates are added in step (a) of the process according to this invention.

Advantageously, step (a) is implemented continuously or discontinuously. These production modes are well known to a person skilled in the art.

Thus, advantageously, step (a) consists of a conventional process for producing a bituminous mix, well known to a person skilled in the art, or a master mix. The bituminous mix obtained in step (a) can be a ready-to-use mix.

The principle, for example, of a continuous mixing plant with a "parallel-current" mixing-drying drum is as follows:

If the mix or the master mix to be produced requires the heating and/or the drying of aggregates, then this drying and/or heating is performed in a parallel-current (gas direction=material direction) mixing-drying drum. Optionally all or some of the recovered fines and added fines can then be introduced and mixed inside the mixing-drying tube. All or some of the bituminous binder is introduced in liquid form and mixed inside the mixing-drying tube. Optionally, all or some of the aggregate mix can be introduced and mixed in the mixing-drying tube. Optionally, all or some of the various additives (fibers, etc.) can be introduced and mixed in the mixing-drying tube.

The mix or the master mix obtained is then stored (step (b)).

The principle, for example, of a continuous mixing plant with a "counter-current" mixing-drying drum is as follows:

If the mix or the master mix to be produced requires heating and/or drying of aggregates, then this drying and/or heating is performed in a counter-current (gas direction opposite material direction) mixing-drying drum. Optionally all or some of the recovered fines and added fines can then be introduced and mixed inside the mixing-drying tube. All or some of the bituminous binder is introduced in liquid form and mixed inside the mixing-drying tube. Optionally, all or some of the aggregate mix can be introduced and mixed in the mixing-drying tube. Optionally, all or some of the various additives (fibers, etc.) can be introduced and mixed in the mixing-drying tube.

The mix or the master mix obtained is then stored (step (b)).

The principle, for example, of a discontinuous mixing plant is as follows:

If the mix or the master mix to be produced requires heating and/or drying of aggregates, then this drying and/or heating is performed in a counter-current (gas direction opposite material direction) drying drum. Optionally, all or some of the aggregate mix can be introduced into the drum in order to be heated and pre-coated. The mixture is then transported to a storage tower with two possibilities:

passage over a screen in order to be reclassified by particle size (if no aggregate mix)

storage in a "direct" buffer bin without passage through the screen. All or some of the bituminous binder is introduced in liquid form in the mixer. All or some of the aggregate mix, recovered fines, added fines, and various additives (fibers, etc.) can be proportioned separately and introduced into the mixer. The mix or the master mix obtained is then stored (step (b)).

Advantageously, the temperature of step (a) and/or (c) is between 80° C. and 200° C.; advantageously, the bituminous mix obtained from step (a) or from steps (a) and (c) is a hot or lukewarm bituminous mix.

The mixing time of step (a) is advantageously between 15 seconds and 2 minutes.

In the sense of this invention, by "storage", it is intended to mean the immobilization of the mix or of the master mix, at a storage site, advantageously a silo, for at least several minutes (at least 10 minutes, for example), advantageously several hours, and advantageously one or two days, sometimes at least one or two weeks, and even at least one or two months.

In a specific embodiment of the invention, the storage time of step (b) is greater than 2 hours, and advantageously greater than 4 hours.

In another advantageous embodiment, the storage time of step (b) depends on the type of mix or master mix obtained in step (a) (hot, cold or lukewarm master mix-mix). In the case of hot or lukewarm mixes or master mix, the storage time is no more than 48 hours, advantageously no more than 24 hours, and advantageously no more than 12 hours. In addition, in this case, the storage is advantageously carried out in a heat-insulated storage device so as to maintain the temperature of the mix or of the master mix at between 60° C. and 200° C. The cold mixes or master mix can be stored longer at room temperature, for example, several days or several weeks or several months (advantageously around 2 months).

In an advantageous embodiment, step (b) is implemented in a suitable storage device. In this case, the mix or master mix obtained in step (a) is transferred to this storage device. These storage devices are well known to a person skilled in the art and are advantageously of the storage silo type. Advantageously, the storage temperature is between room temperature and 200° C.

Advantageously, steps (a) and (c) are implemented in two different mixing devices. There is therefore a transfer of the mix or master mix between the two devices, advantageously between the device of step (a) and the storage device of step (b) and between the storage device of step (b) and the device of step (c). The mixing devices of steps (a) and (c) are well known to a person skilled in the art. They can be one and the other of the same type or totally different.

In an advantageous embodiment, step (c) consists of modifying a hot, cold or lukewarm ready-to-use bituminous mix obtained in step (a) by adding a thinning agent, advantageously water, as the additional formulation component, so as to obtain a ready-to-use bituminous mix in step (c) that is more malleable than that obtained at the end of storage in step (b). Indeed, the cooling of the mix during storage can make it less malleable.

In this case, to use this mix, it is necessary to add, as an additional formulation component, a thinning agent, alone or in combination with another additional formulation component.

In another embodiment of the invention, the additional formulation component consists of all of the medium size aggregates, with the bituminous mix obtained in step (a) being a ready-to-use porous asphalt. In this case, no medium size aggregates is added in step (a). Advantageously, a bitumen complement is added at the same time as the medium size aggregates and the additional formulation component consists of a mixture of bitumen and medium size aggregates, with only a portion of the bitumen and not all of it having been added in step (a).

In a third embodiment of the invention, step (a) consists of mixing all of the bituminous binder with all of the aggregates and optionally all or some of the fines, and the additional formulation component of step (c) consists of coloring agent alone or in combination with another additional formulation component, advantageously powder or granular, and advantageously iron oxide, so as to obtain a colored ready-to-use bituminous mix.

In another embodiment of the invention, step (a) consists of producing a master mix, in which the bitumen and/or aggregates complement is added in step (c) as an additional formulation component, alone or in combination with another additional formulation complement, advantageously an additive.

Advantageously, step (c) is implemented at the mix production site, in particular when the additional formulation component is a thinning agent and/or is in liquid form and not at the spreading site; advantageously, steps (b) and (c) are implemented at the same site; and even more advantageously, steps (a), (b) and (c) are implemented at the same site.

Thus, in the production of colored mixes, advantageously red mixes, at continuous plants, the principle is to:

produce non-colored mixes in step (a), i.e. without adding coloring agent in step (a);

transport these non-colored mixes via the conventional circuit;

store these non-colored mixes in a silo with a device enabling a mixer to be supplied in order to carry out step (c);

proportioning and introducing, in a dedicated mixer in BATCH mode, a defined amount of non-colored mix (intermediate weighing hopper or mixer on scale). Various capacities are possible;

adding, to the proportioned amount of non-colored mix, the coloring agent (advantageously iron oxide for red coloring) corresponding to the desired formula and the size of the batch;

mixing the coloring agent with the non-colored mix in the mixer.

Example of Implementation of the Process According to the Invention in the Laboratory and Verification of the Impact of Storage Time on the Final Product:

Test 1: Production of a conventional red mix formulation according to a standard process (discontinuous plant);

Tests 2 and 3:

Production of the same red mix formulation according to the process described above without introducing iron oxide in step (a) and at a temperature of 150° C., Storage of the product obtained in step (a) at constant temperature (150° C.) during this waiting time.

Test 2: Storage time 2 hours (step (b))

Test 3: Storage time 4 hours (step (b))

Introduction and mixing of iron oxide after storage (step (c)).

The formulation of the mix is presented in table 1 below:

| Formulation (% by weight) | Thiviers 0/2 aggregates | 46.50% |
|---|---|---|
| | Thiviers 2/6 aggregates | 50% |

-continued

| | |
|---|---|
| Red powder iron oxide | 3.50% |
| Pure 50/70 Azalt bitumen | 6.8 ppc |

Production temperature: 150° C.

The mixing times are presented in table 2 below:

| Mix type | Mixing time (step (a)) (seconds) | Additional mixing time (step (c)) (seconds) |
|---|---|---|
| Test 1 | 20 + 10 | 0 |
| Test 2 | 30 | 30 |
| Test 3 | 30 | 30 |

Concerning the mixtures, there is no problem of adding the coloring agent after two or four hours; the mixture is successful with 30 seconds of additional time (step c).

Visually, the mixes are identical. The red color is homogeneous throughout the entire mix regardless of the process used (test 1, 2 or 3). The mechanical properties obtained are identical regardless of the process used (test 1, 2 or 3).

The invention claimed is:

1. Process for producing a hot, cold or lukewarm ready-to-use bituminous mix, wherein the process comprises the following successive steps:
    (a) preparing a hot, cold or lukewarm master mix or bituminous mix by mixing some or all of a bituminous binder proportioned in liquid form with all of aggregates, and optionally with
        some or all of fines and/or
        some or all of aggregate mix and/or
        some or all of various additives
    so as to obtain a mixture in which the aggregates and any fines and aggregate mix are coated by bitumen,
    (b) storing of the master mix or of the bituminous mix obtained in step (a) with a storage time greater than 4 hours,
    (c) mixing the master mix or the bituminous mix stored in step (b) with one or more additional formulation components so as to obtain a hot, cold or lukewarm ready-to-use bituminous mix,
    in which step (c) is implemented at a mix production site if the additional formulation component is a thinning agent.

2. Process according to claim 1, wherein the additional formulation component(s) of step (c) is (are) chosen from: bituminous binder complement and/or aggregate mix complement, and/or all of the fines or a complement thereof, and/or all of the additives or a complement thereof and/or a mixture thereof.

3. Process according to claim 2, wherein the additional formulation components are chosen from coloring agents, fluxing agents, thinning agents, ground vulcanized rubber, fibers, glass or mirror pieces, zeolites, gilsonites, cements, lime, wire waste, polyethylene, polymers, waxes, plant-based additives and mixtures thereof.

4. Process according to claim 2, wherein the additional formulation components are powder or granular additives.

5. Process according to claim 1, wherein step (a) consists of mixing all of the bituminous binder with all of the aggregates and optionally all or some of the fines, and in that the additional formulation component of step (c) consists of coloring agent, so as to obtain a colored ready-to-use bituminous mix.

6. Process according to claim 1, wherein step (c) consists of modifying a hot, cold or lukewarm ready-to-use bituminous mix obtained in step (a) by adding a thinning agent, as the additional formulation component, so as to obtain a ready-to-use bituminous mix that is more malleable than that obtained after storage in step (b).

7. Process according to claim 1, wherein the bituminous mix is a hot or lukewarm bituminous mix and a temperature of mixing in step (a) and a temperature of storing in step (c) are each between 80° C. and 200° C.

8. Process according to claim 1, wherein steps (a) and (c) are implemented in two different mixing devices.

9. Process according to claim 1, wherein step (a) is implemented continuously or discontinuously.

10. Process according to claim 1, wherein step (c) is implemented continuously or discontinuously.

11. Process according to claim 1, wherein the bituminous binder is a pure bitumen, an additive-containing bitumen, a clear synthetic oil-based binder, a pigmentable bitumen, a colored bitumen or a plant-based binder.

12. Process according to claim 1, wherein step (b) is implemented in a suitable storage device.

13. Process according to claim 4, wherein the additional formulation components are coloring agents.

14. Process according to claim 6, wherein the thinning agent is water.

15. Process for producing a hot, cold or lukewarm ready-to-use bituminous mix, wherein the process comprises the following successive steps:
    (a) preparing a hot, cold or lukewarm master mix or bituminous mix by mixing some or all of a bituminous binder proportioned in liquid form with some or all of aggregates, and optionally with
        some or all of fines and/or
        some or all of aggregate mix and/or
        some or all of various additives
    so as to obtain a mixture in which the aggregates and any fines and aggregate mix are coated by bitumen,
    (b) storing of the master mix or of the bituminous mix obtained in step (a),
    (c) mixing the master mix or the bituminous mix stored in step (b) with one or more additional formulation components so as to obtain a hot, cold or lukewarm ready-to-use bituminous mix,
    in which step (c) is implemented at a mix production site if the additional formulation component is a thinning agent,
    wherein the additional formulation component(s) of step (c) is (are) chosen from: bituminous binder complement and/or the aggregates complement and/or aggregate mix complement, and/or all of the fines or a complement thereof, and/or all of the additives or a complement thereof and/or a mixture thereof,
    wherein the additional formulation components are powder or granular additives.

* * * * *